(12) United States Patent
Lee

(10) Patent No.: US 10,739,475 B2
(45) Date of Patent: *Aug. 11, 2020

(54) RADIATION IMAGING METHOD

(71) Applicant: VIEWORKS CO., LTD., Anyang-si, Gyeonggi-do (KR)

(72) Inventor: Denny Lap Yen Lee, West Chester, PA (US)

(73) Assignee: VIEWORKS CO., LTD., Anyang-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,533

(22) Filed: Sep. 30, 2019

(65) Prior Publication Data

US 2020/0025954 A1 Jan. 23, 2020

Related U.S. Application Data

(62) Division of application No. 16/036,856, filed on Jul. 16, 2018, now Pat. No. 10,466,370.

(51) Int. Cl.
*G01T 1/24* (2006.01)
(52) U.S. Cl.
CPC .............. *G01T 1/247* (2013.01); *G01T 1/246* (2013.01)
(58) Field of Classification Search
CPC ............ G01T 1/247; G01T 1/246; G01T 1/24
USPC .................................................... 250/370.09
See application file for complete search history.

(56) References Cited

U.S. PATENT DOCUMENTS 5,262,649 A 11/1993 Antonuk et al.
5,319,206 A 6/1994 Lee et al.
2001/0006545 A1 7/2001 Kim
2005/0024581 A1 2/2005 Kim et al.
2007/0122543 A1 5/2007 Yanoff et al.
2010/0051820 A1 3/2010 Okada
2011/0241143 A1 10/2011 Kim et al.
2012/0038013 A1 2/2012 Karim et al.
(Continued)

FOREIGN PATENT DOCUMENTS

EP 0 602 475 A2 6/1994
EP 1 246 250 A2 10/2002
JP 2015-005533 A 1/2015

OTHER PUBLICATIONS

Extended European Search Report dated Jan. 3, 2020.

*Primary Examiner* — David P Porta
*Assistant Examiner* — Gisselle M Gutierrez
(74) *Attorney, Agent, or Firm* — Rabin & Berdo, P.C.

(57) ABSTRACT

A method of operating a radiation imaging system includes applying a bias voltage to a top electrode, receiving ionization radiation, wherein the ionization radiation penetrates an electrical insulation layer and generate a charge signal, storing the charge signal in a storage capacitor among a plurality of storage capacitors, changing a polarity of a gate line bias voltage of one row of transistors among a plurality of transistors, and integrating charges from storage capacitors connected to each other along orthogonal data lines. The imaging system includes an electrical insulation layer having a top surface and a bottom surface, a top electrode on the top surface of the electrical insulation layer, a plurality of pixel units electrically coupled to the electrical insulation layer, the plurality of pixel units including a plurality of storage capacitors, and a plurality of transistors connected to the plurality of pixel units such that a respective transistor is connected to each of the plurality of pixel units.

12 Claims, 5 Drawing Sheets

(56) References Cited

U.S. PATENT DOCUMENTS

| | | |
|---|---|---|
| 2013/0009069 A1 | 1/2013 | Okada |
| 2013/0092845 A1 | 4/2013 | Mollov |
| 2014/0117246 A1 | 5/2014 | Zhou et al. |
| 2015/0303245 A1 | 10/2015 | Kashiwabara et al. |
| 2016/0172429 A1 | 6/2016 | Kondoh et al. |
| 2016/0315130 A1 | 10/2016 | Kajiyama et al. |
| 2017/0005155 A1 | 1/2017 | You et al. |
| 2017/0365635 A1 | 12/2017 | Yang |
| 2018/0083079 A1 | 3/2018 | Kajiyama et al. |

RADIATION IMAGING METHOD

FIELD OF THE INVENTION

The present invention relates to a radiation imaging method. More particularly, the present invention relates to a radiation imaging method using a radiation imaging system including an electrical insulation material under an applied electric field.

BACKGROUND

Radiograms have been produced by using layers of radiation sensitive materials to directly capture radiographic images as image-wise modulated patterns of electrical charges. Depending on the intensity of the incident x-ray radiation, electrical charges generated either electrically or optically by the x-ray radiation within a pixelized area are quantized using a regularly arranged array of discrete solid-state radiation sensors.

U.S. Pat. No. 5,319,206 describes a system employing a layer of photoconductive material to create an image-wise modulated areal distribution of electron-hole pairs which are subsequently converted to corresponding analog pixel (picture element) values by electro-sensitive devices, such as thin-film transistors. U.S. Pat. No. 5,262,649 describes a system employing a layer of phosphor or scintillation material to create an image-wise modulated distribution of photons which are subsequently converted to a corresponding image-wise modulated distribution of electrical charges by photosensitive devices, such as amorphous silicon photodiodes. These solid-state systems have the advantage of being useful for repeated exposures to x-ray radiation without consumption and chemical processing of silver halide films.

In systems utilizing a photoconductive material such as selenium such as the prior art, a conventional radiation imaging system 100 shown in FIG. 1, before exposure to image-wise modulated x-ray radiation, an electrical potential is applied to the top electrode 110 to provide an appropriate electric field. During exposure to x-ray radiation, electron-hole pairs are generated in the photoconductive layer 190, under the dielectric layer 120, in response to the intensity of the image-wise modulated pattern of x-ray radiation, and these electron-hole pairs are separated by the applied biasing electric field supplied by a high voltage power supply. The electron-hole pairs move in opposite directions along the electric field lines toward opposing surfaces of the photoconductive layer 190. After the x-ray radiation exposure, a charge image is received at the charge-collection electrode 130 and stored in the storage capacitor 160 of the transistor 150, which is formed on the substrate 170. This image charge is then readout by an orthogonal array of thin film transistors and the charge integrating amplifier 140. This type of direct conversion system has the distinct advantage of maintaining high spatial resolution more or less independent with the thickness of the x-ray converting photoconductive layer. However, currently, only a very limited number of direct converting photoconductors can be used for commercial products.

The most popular and technical matured material is amorphous selenium that has good charge transport properties for both holes and electrons generated by the x-ray. However, selenium having an atomic number of 34 has only good x-ray absorption in the low energy range, typically below 50 KeV. The absorption coefficient of selenium at higher energy x-ray is smaller and therefore thicker selenium layer is required for adequate x-ray capture. Since the complication and difficulty of fabrication of good imaging quality amorphous selenium is a strong function of the selenium thickness, successful x-ray imaging products so far are limited to lower energy x-ray application such as mammography, low energy x-ray crystallography, and low energy non-destructive testing.

For high energy or high intensity x-ray applications, a large number of electron hole-pairs can be generated from each absorbed x-ray photon. When the electrons and holes move along the electric field to the charge collecting electrodes or to the bias electrode, a significant number of electrons and/or holes can be trapped in the selenium layer. These trapped charges will alter the local electric field, and therefore the subsequent charge transport and charge generation efficiency, resulting in a shadow of the previous image superimposed on the subsequent image in a phenomenon known as "ghosting". Certain image erasing processes are in general required to remove these charges and to restore the selenium layer to uniform charge conversion properties.

After exposure to a first x-ray, selenium experiences charge trapping, and therefore, it suffers from the ghosting effect. Due to these unwanted results, an erase process is needed to reduce the ghosting. K-band radiation from amorphous selenium can also deteriorate image resolution.

It is therefore desirable to design a radiation imaging system without loss of resolution, and with minimized ghosting in high x-ray radiation energy or high dose.

SUMMARY OF THE INVENTION

A radiation imaging system according to an embodiment of the invention has an electrical insulation layer with a top surface and a bottom surface, a top electrode on the top surface of the electrical insulation layer, an array of pixel units electrically coupled to the electrical insulation layer, and an array of transistors connected to the array of pixel units is provided.

In an aspect of the present invention, a radiation imaging system is provided having an electrical insulation layer with a top surface and a bottom surface, a top electrode on the top surface of the electrical insulation layer, an array of pixel units electrically coupled to the electrical insulation layer, and an array of transistors connected to the array of pixel units. Each of the plurality of pixel units comprises a charge collection electrode disposed at the bottom surface of the electrical insulation layer. Each of the plurality of pixel units further comprises a charge storage capacitor and at least one transistor.

The plurality of pixel units are electrically coupled to the electrical insulation layer without an x-ray semiconductor. The transistor is coupled between the charge collection electrode and a charge integrating amplifier.

In another aspect of the present invention, a method of operating a radiation imaging system having an electrical insulation layer with a top surface and a bottom surface, a top electrode on the top surface of the electrical insulation layer, an array of pixel units electrically coupled to the electrical insulation layer, and an array of transistors connected to the array of pixel units is provided.

It is therefore an object, aspect and advantage of the present invention to provide a radiation imaging system having an electrical insulation layer with a top surface and a bottom surface, a top electrode on the top surface of the electrical insulation layer, an array of pixel units electrically coupled to the electrical insulation layer without an x-ray semiconductor, and an array of transistors connected to the array of pixel units.

Further objects, aspects and advantages of the present invention will become apparent by reference to the following description and appended drawings wherein like reference numbers refer to the same component, element or feature.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

The present invention provides a radiation imaging system and a method for operating the radiation imaging system. Details of the present disclosure will be explained in more detail with reference to the following examples and preparative examples. Embodiments that are not included herein will be readily recognized and appreciated by those skilled in the art, and an explanation thereof is omitted.

The radiation may be at least one selected from X-ray, gamma-ray, and ionization radiation. The ionization radiation may include all radiation that penetrates material and produces light in scintillation material. For example, the ionization radiation may include alpha-ray, beta-ray, proton beam, charged particle beam, neutron and the like.

Figure 2:
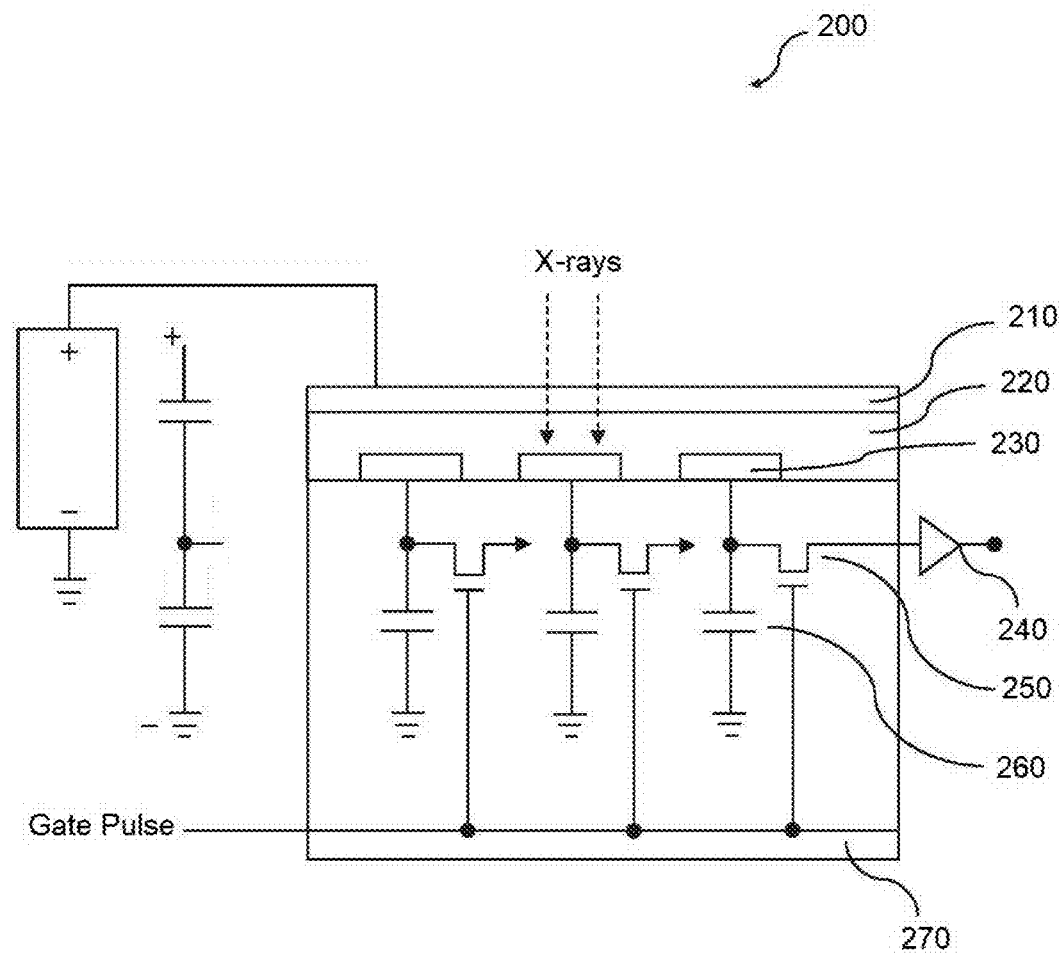
FIG. 2 illustrates a schematic view of a radiation imaging system, according to an embodiment of the present invention.

FIG. 2 is a schematic view illustrating a radiation imaging system 200 according to an embodiment of the present invention. The radiation imaging system 200 includes a top electrode 210, an electrical insulation layer 220, and a charge collection electrode 230. The radiation imaging system 200 further includes a charge integrating amplifier 240, a transistor 250, and a storage capacitor 260. The top electrode 210 may be formed by sputtering deposition and/or adhesion. Examples of the electrical insulation layer 220 include, but not limited to, organic compounds which comprises low Z materials such as H, O, C, N, F; such as polytetrafluoroethylene (TEFLON), acrylic resins. Preferred examples of materials for the electrical insulation layer 220 are parylene, BCB (Benzocyclobutene), and polyimide film (KAPTON), which have high dielectric strength. Vacuum deposition can be used for parylene and adhesion can be used for either parylene or KAPTON by preparing film tape, preferably having a thickness of 50 micron.

In the radiation imaging system 200, the top electrode 210 is disposed at the top surface of the electrical insulation layer 220 and the charge collection electrode 230 as a pixel unit is disposed at the bottom surface of the electrical insulation layer 220. In one embodiment, pixel units are electrically coupled to the electrical insulation layer 220 and at least one transistor is connected to each pixel unit so that the pixel units are disposed at the bottom surface of the electrical insulation layer 220. Each transistor is coupled between one of the charge collection electrodes 230, disposed within the bottom surface of the electrical insulation layer 220, and a ground.

In another embodiment, a pixel unit may comprise the charge collection electrode 230, the storage capacitor 260, and the transistor 250. The charge collection electrode 230 collects a charge signal in a pixel area of the electrical insulation layer 220. The storage capacitor 260 is connected to the charge collection electrode 230 for storing the charge signal collected by the charge collection electrode 230. The field effect transistor (FET) 250 is connected to the charge collection electrode 230 and is acting as a switch between the storage capacitor 260 and the external charge integrating amplifier 240.

Figure 3:
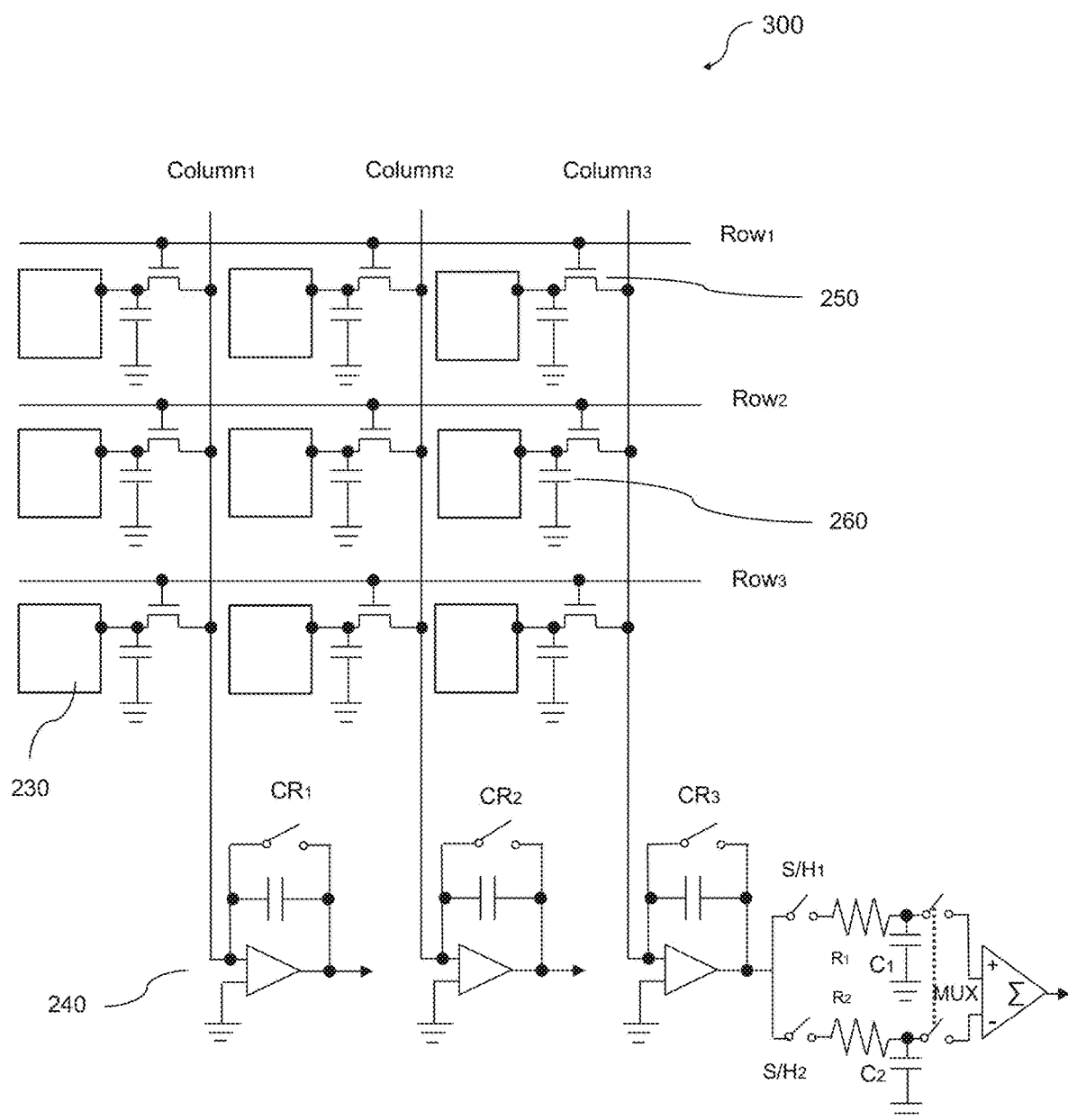
FIG. 3 illustrates a schematic diagram of a readout circuit, according to an embodiment of the present invention.

FIG. 3 illustrates a schematic diagram of a readout circuit, according to an embodiment of the present invention.

As shown in FIG. 3, the pixel matrix is arranged multiple rows and multiple columns, such as N rows by M columns. Although FIG. 3 illustrates an arrangement of three (3) rows by three (3) columns, other numbers of rows and columns may be utilized. The gate lines of each row of transistors are connected to each of a multiplicity of external gate drivers. A data line of each column of transistors, orthogonal to the gates lines, is connected to each of multiplicity of charge integrating amplifiers. Before the x-ray exposure, a bias voltage with a magnitude up to, but not exceeding, the breakdown voltage of the electrical insulator is applied to the top electrode 210, and a negative voltage is applied to all the gate electrode of the pixel FET transistors. During the x-ray exposure, the leakage current of the electrical insulation layer 220 is increased proportional to the intensity or the dose of the radiation. The local leakage charge above each pixel is then stored in the storage capacitor 260.

During readout of the x-ray image, the gate voltage in one row is turned from negative to positive allowing the charge stored in each pixel in that row to flow via the orthogonal data line to the respective charge integrating amplifier and subsequently digitized by the processing computer. After the data of one row in the matrix is completed, the potential of the gate line in that row will return to negative, returning the FET transistor to an "off" state. The potential of the gate line of the next row will then turn from negative to positive allowing the stored charge to flow to the orthogonal charge integrating amplifiers. This process will repeat in turns until all the charges in the pixel matrix are read out.

In one embodiment, an array of pixel units is directly coupled to the electrical insulation layer 220 without a layer for a radiation converter having a charge generation material (CGM), such as amorphous selenium, or without a photoconductive layer for converting x-ray energy to electron-hole pairs. Using a thin layer of electrical insulation material without a layer with selenium, the charge generation efficiency is typically 100 times less than the charge generation efficiency of selenium. However, upon the exposure to x-ray radiation, the minute charge (in comparison to a layer with selenium) retains the high spatial resolution, while exhibiting orders of magnitude less charge trapping or alternation of local electric field affecting the subsequent images. The radiation imaging system 200 having the electrical insulation layer 220 and the charge collection electrode 230 within the electrical insulation layer 220 does not have a layer with selenium, and does not have a layer on the electrical insulation layer 220 for blocking electrons.

In one embodiment according to the present invention, the radiation imaging system 200 is good for obtaining high resolution images with a high dose of radiation, or high energy x-rays such as high energy non-destructive testing (NDT).

In one embodiment according to the present invention, the range of x-ray energy may be anywhere from about 5 KeV to about 10 MeV. However, any level of x-ray energy may be applied depending on a purpose of using the radiation imaging system 200 without departing from the scopes of the present invention. According to an embodiment, the electrical insulation layer 220 may have a thickness of about 0.1 micrometer or greater. However, any thickness of the electrical insulation layer 220 may be selected depending on a purpose of using the radiation imaging system 200 without departing from the scopes of the present invention. In one embodiment, the electrical insulation layer 220 may be deposited on top of the charge collection electrode 230. The charge collection electrode 230 may be disposed at the bottom surface of the electrical insulation layer 220 instead of the top surface of the electrical insulation layer 220 where the top electrode 210 is attached. In another embodiment, the charge collection electrode 230 may be integrated in the electrical insulation layer 220 at the bottom surface of the electrical insulation layer 220 as shown in FIG. 2.

In one embodiment, the radiation imaging system 200 can be prepared beginning with a commercially available thin film transistor panel which comprises a substrate 270, the storage capacitors 260, the transistors 250, and the charge integrating amplifier 240. Commercially available panels used in liquid crystal displays may be a convenient starting point for building a thin film transistor panel. The charge collection electrode 230 may be formed on the thin film transistor panel. Over the surface of the charge collection electrode 230 there may be applied the electrical insulation layer 220. The top electrode 210 may be formed on the electrical insulation layer 220.

A scintillating light of conventional scintillation imaging detectors needs to travel a long distance of typically hundreds of microns before converting the light to electrical charge by means of photo diodes. Along this long optical path, the scintillation light of conventional scintillation imaging detectors may undergo scattering inside the scintillation material, resulting in image sharpness degradation.

On the other hand, a problem with conventional direct conversion photoconductive material, such as amorphous selenium, is that some of the electrical charges generated within the photoconductive layer may continue to reside as trapped charges not only within the photoconductive layer but also at planar interfaces between the surfaces of the photoconductive layer and adjacent layers. These residual electrical charges must be fully eliminated prior to the next x-ray exposure. Otherwise, a false image pattern related to the previous radiation pattern may be added to subsequent radiograms. In the radiation imaging system 200 of the present invention, electrical insulation material with no significant hysteretic charge movement is used with a novel structure or configuration of the top electrode 210, the electrical insulation layer 220, and the charge collection electrode 230, and thus, no residual charge-erasing scheme is required for imaging and high spatial resolution can be retained.

Figure 4:
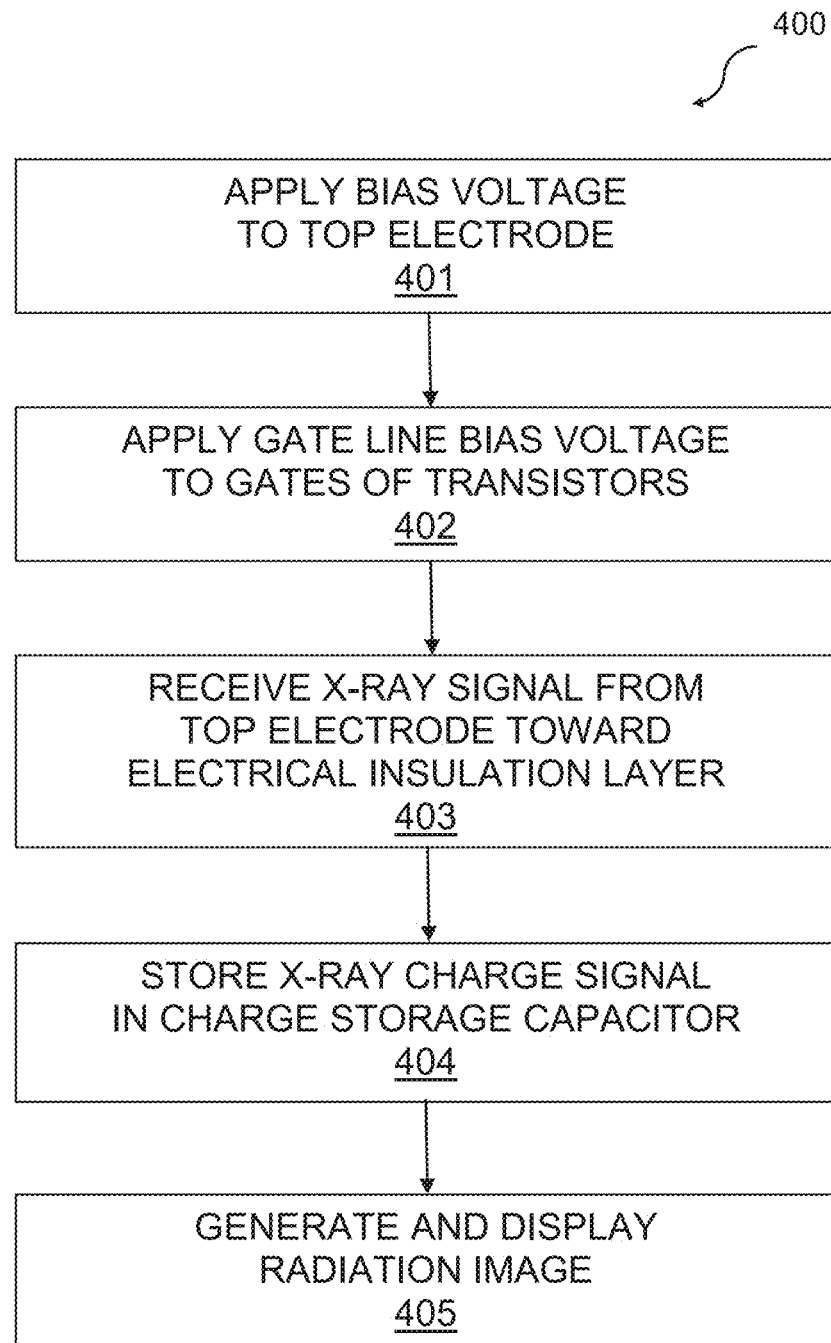
FIG. 4 illustrates a flowchart of a method for operating a radiation imaging system, according to an embodiment of the present invention.

FIG. 4 illustrates a flowchart of a method 400 for operating a radiation imaging system 200, according to an embodiment of the present invention. The radiation imaging system includes an electrical insulation layer having a top surface and a bottom surface, a top electrode on the top surface of the electrical insulation layer, an array of pixel units electrically coupled to the electrical insulation layer, and an array of transistors connected to the array of pixel units. The method 400 may be performed and operated electronically using a Graphical User Interface (GUI) in a computer system.

An embodiment of a method in which the radiation imaging system 200 shown in FIG. 2 and FIG. 3 may be employed for acquiring an image with high spatial image resolution will now be described with respect to the following flow diagram of the method 400 depicted in FIG. 4. It should be apparent to those of ordinary skill in the art that the method 400 represents a generalized illustration and that other steps may be added, or existing steps may be removed, modified or rearranged without departing from the scopes of the method 400. In addition, the method 400 is described with respect to the radiation imaging system 200 by way of example and not limitation, and the method 400 may be performed in other types of radiation imaging systems.

At step 401, a bias voltage with magnitude up to but not exceeding the breakdown voltage of the electrical insulation layer is applied to the top electrode 210 toward the electrical insulation layer 220.

At step 402, a gate line bias voltage is applied to gates of the transistors 250 to render each of the transistors 250 to be in an "off" state.

At step 403, an x-ray signal is received from the top electrode 210 toward the electrical insulation layer 220 and thereafter an x-ray photon penetrates the electrical insulation layer to generate a charge signal. According to one embodiment, an energy of the x-ray signal may be in a range from 5 KeV to about 10 MeV. At step 403, the signal is collected at the array of pixel units. Each of the pixel units includes the charge collection electrode 230 disposed at the bottom surface of the electrical insulation layer 220 as depicted in FIG. 2. At step 403, the signal is collected within the electrical insulation layer 220.

At step 404, the x-ray charge signal is stored in a charge storage capacitor 260. The polarity of one row of the gate line bias voltage is changed to render all pixel transistors in the respective row to be in an "on" state. Further, the charges from the orthogonal data line is integrated and then the integrated charge is digitized as a value to be stored in the computer memory. The polarity of the gate line bias voltage is restored to render the respective row of transistor to be in the "off" state. The polarity of the next row of gate line bias voltage is changed to render all the pixel transistors in the next row to be in the "on" state. These steps may be repeated until all the charge signals stored in the array are read out and stored in the computer memory.

At step 405, a radiation image is generated based on the signal stored at the charge storage capacitor and the generated radiation image is displayed for a user. The radiation image may be electrically displayed via a computer monitor or on a film or a paper.

Figure 1:
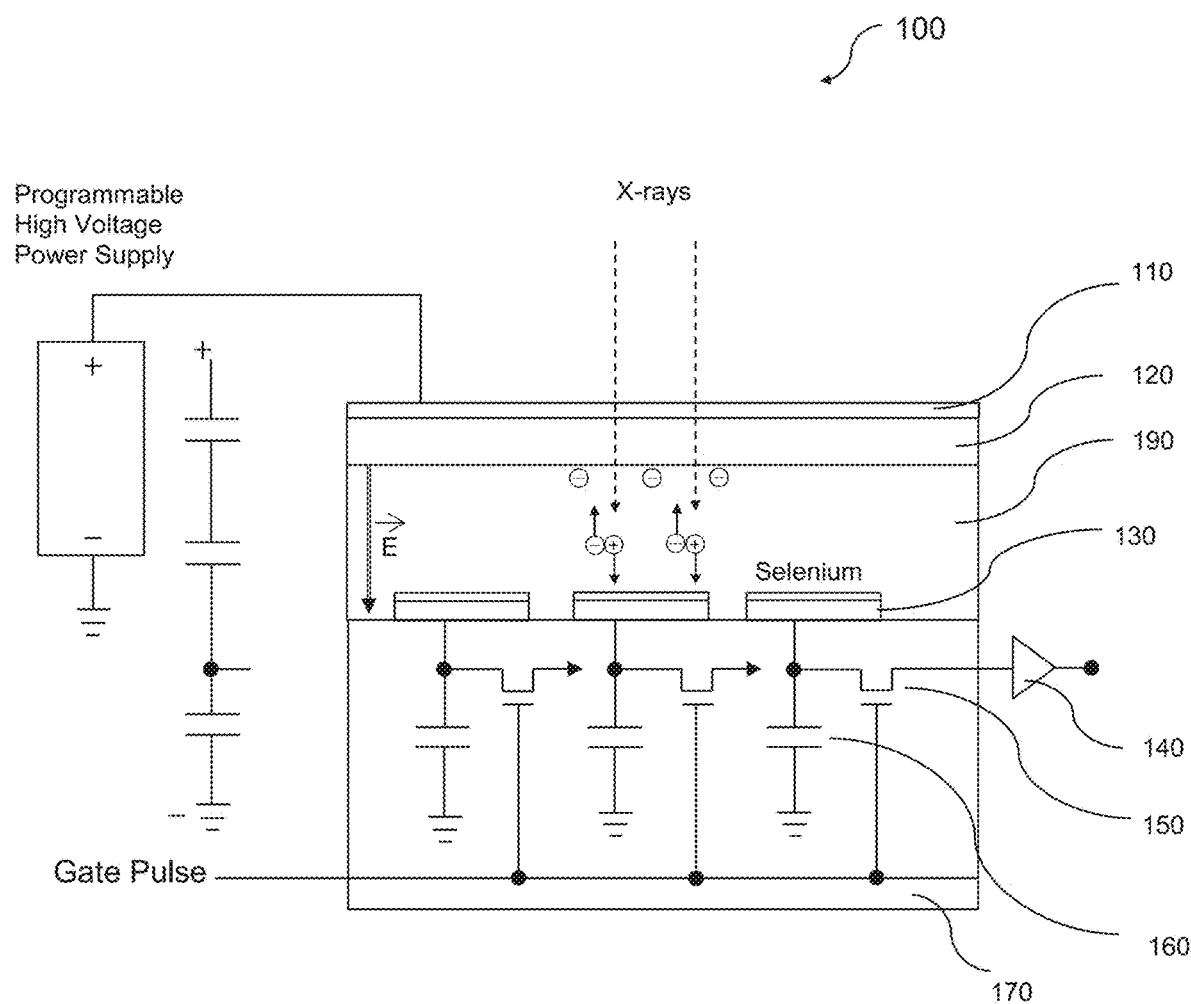
FIG. 1 illustrates a schematic view of a conventional radiation imaging system using a Direct Conversion Technology (DCT)
Figure 5:
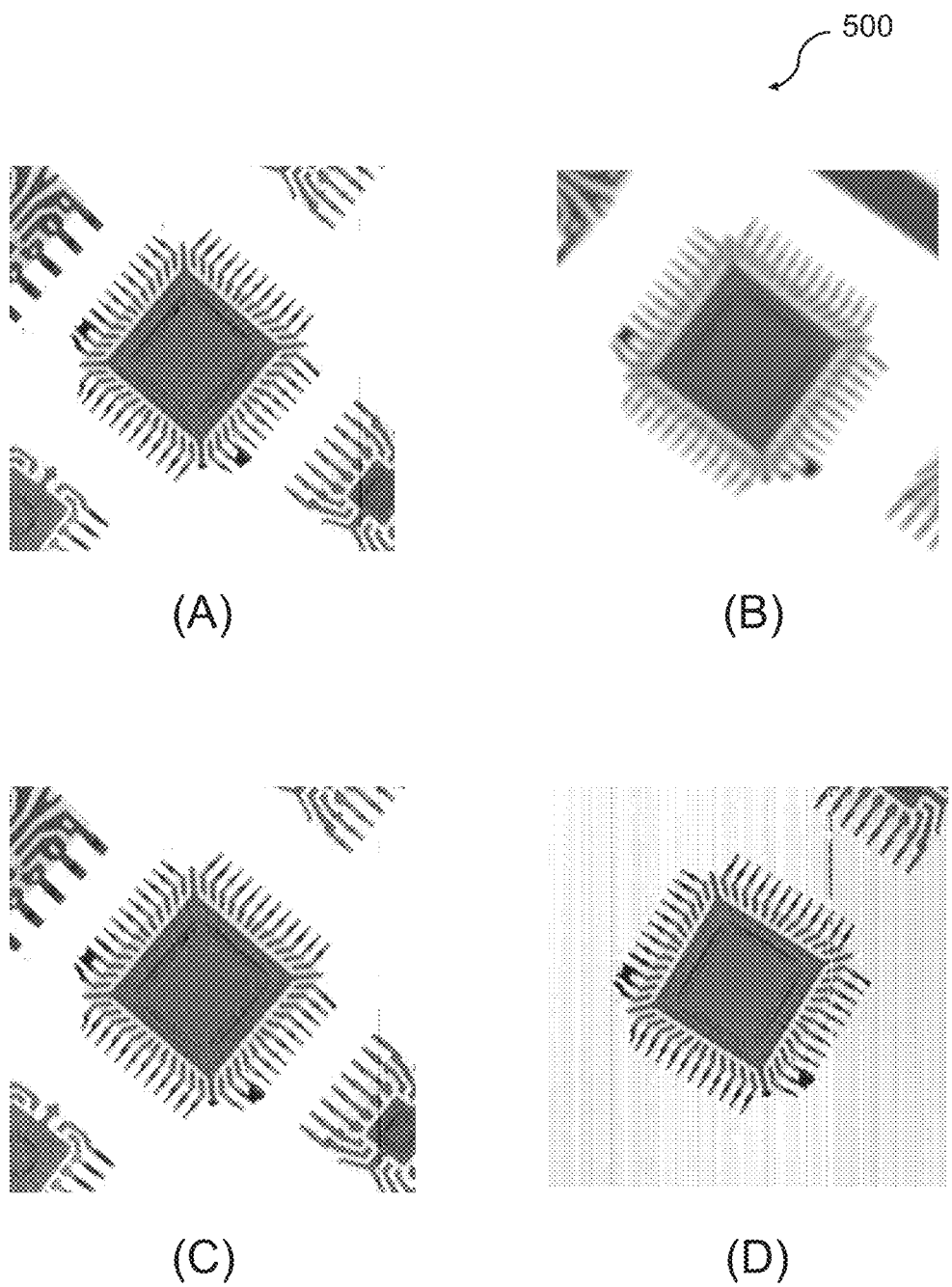
FIG. 5 shows comparison of x-ray images obtained from the radiation imaging system 200, according to an embodiment of the present invention, and x-ray images obtained from conventional radiation imaging systems.

FIG. 5 shows comparison of x-ray images obtained from the radiation imaging system 200, according to an embodiment of the present invention, and x-ray images obtained from conventional radiation imaging systems. FIGS. 5(A) and 5(C) show x-ray images obtained from the radiation imaging system 200, according to an embodiment of the present invention. FIG. 5(B) shows an x-ray images obtained from an x-ray detector using an indirect conversion method. FIG. 5(D) shows an x-ray images obtained from an x-ray detector using a direct conversion method including a structure similar to that shown in FIG. 1, including the photoconductive layer 190. The x-ray image obtained from the radiation imaging system 200, according to an embodiment of the present invention shows superior image quality compared to the x-ray image obtained from an x-ray detector using the indirect conversion method. In addition, the x-ray image obtained from the radiation imaging system 200, according to an embodiment of the present invention shows better image quality or at least the same compared to the x-ray image obtained from an x-ray detector using the direct conversion method.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method of operating a radiation imaging system comprising an electrical insulation layer having a top surface and a bottom surface, a top electrode on the top surface of the electrical insulation layer, a plurality of pixel units electrically coupled to the electrical insulation layer, the plurality of pixel units including a plurality of storage capacitors, and a plurality of transistors connected to the plurality of pixel units such that a respective transistor is connected to each of the plurality of pixel units, the method comprising:
    (1) applying a bias voltage to the top electrode;
    (2) receiving ionization radiation, wherein the ionization radiation penetrates the electrical insulation layer and generate a charge signal;
    (3) storing the charge signal in a storage capacitor among the plurality of storage capacitors;
    (4) changing a polarity of a gate line bias voltage of one row of transistors among the plurality of transistors; and
    (5) integrating charges from storage capacitors connected to each other along orthogonal data lines.

2. The method of claim 1, wherein the step (5) further comprises digitizing the integrated charges as a value and storing the value to a computer memory.

3. The method of claim 2, wherein the method further comprises
    (6) restoring the polarity of the gate line bias voltage to render the one row of the transistors to be in off states.

4. The method of claim 3, wherein the method further comprises
    (7) changing the polarity of the next row of the gate line bias voltage to render the transistors in the next row to be in on states.

5. The method of claim 4, wherein the method further comprises
    (8) repeating the steps of (5), (6), and (7) until all the charge signals are read out and stored in the computer memory.

6. The method of claim 1, wherein the bias voltage has a magnitude no greater than a breakdown voltage of the electrical insulation layer.

7. The method of claim 1, wherein the method further comprises, before receiving the x-ray signal from the top electrode toward the electrical insulation layer, applying the gate line bias voltage to gates of the transistors.

8. The method of claim 7, wherein the gate line bias voltage is applied to the gates of the transistors to render the transistors to be in off states.

9. The method of claim 8, wherein, in step (4), the polarity of the gate line bias voltage of one row of the transistors is changed to render all transistors in the one row to be in on states.

10. The method of claim 1 further comprising, generating and displaying a radiation image based on the charge signal.

11. A method of operating a radiation imaging system comprising an electrical insulation layer having a top surface and a bottom surface, a top electrode on the top surface of the electrical insulation layer, an array of pixel units electrically coupled to the electrical insulation layer, the plurality of pixel units including a plurality of storage capacitors, and an array of transistors connected to the array of pixel units, the method comprising:
    (1) applying a bias voltage with a magnitude no greater than a breakdown voltage of the electrical insulation layer to the top electrode;
    (2) applying a gate line bias voltage to gates of the transistors to render each of the transistors to be in an off state;
    (3) receiving ionization radiation, wherein the ionization radiation penetrates the electrical insulation layer and generate charge signal;
    (4) storing the charge signal in a storage capacitor among the plurality of storage capacitors;
    (5) changing a polarity of the gate line bias voltage of one row of the array of transistors to render all transistors in the one row to be in an on state;
    (6) integrating charges from a plurality of the storage capacitors connected along an orthogonal data line, digitizing the integrated charges as a value, and storing the value to a computer memory;
    (7) restoring the polarity of the gate line bias voltage to render the one row of the transistors to be in the off state;
    (8) changing the polarity of the next row of the gate line bias voltage to render the transistors in the next row to be in the on state;
    (9) repeating the steps of (6), (7), and (8) until all the charge signals stored in the array are read out and stored in the computer memory.

12. The method of claim 11 further comprising, generating and displaying a radiation image based on the charge signal.

* * * * *